(12) United States Patent
Maruo et al.

(10) Patent No.: US 9,209,729 B2
(45) Date of Patent: Dec. 8, 2015

(54) SHIFT RANGE SWITCHING APPARATUS

(71) Applicant: Mitsubishi Electric Corporation, Tokyo (JP)

(72) Inventors: Toshiaki Maruo, Kobe (JP); Takeshi Hashimoto, Kobe (JP); Takahiko Ono, Kobe (JP)

(73) Assignee: Mitsubishi Electric Corporation, Tokyo (JP)

( * ) Notice: Subject to any disclaimer, the term of this patent is extended or adjusted under 35 U.S.C. 154(b) by 30 days.

(21) Appl. No.: 14/305,762

(22) Filed: Jun. 16, 2014

(65) Prior Publication Data
US 2015/0222211 A1 Aug. 6, 2015

(30) Foreign Application Priority Data

Feb. 4, 2014 (JP) ................... 2014-019190

(51) Int. Cl.
*F16H 61/32* (2006.01)
*H02P 6/00* (2006.01)
*H02P 6/24* (2006.01)

(52) U.S. Cl.
CPC ........................................ *H02P 6/24* (2013.01)

(58) Field of Classification Search
USPC ............. 74/473.12; 318/630, 626, 603, 400.2
See application file for complete search history.

(56) References Cited

U.S. PATENT DOCUMENTS

| 2003/0222617 A1 | 12/2003 | Nakai et al. |
| 2006/0197489 A1 | 9/2006 | Nakai et al. |
| 2007/0182353 A1 | 8/2007 | Kamio et al. |
| 2009/0193923 A1 | 8/2009 | Nakai et al. |
| 2011/0068730 A1 | 3/2011 | Nakai et al. |
| 2012/0234124 A1* | 9/2012 | Nozaki ................... F16H 61/32 74/473.12 |

FOREIGN PATENT DOCUMENTS

| JP | H02142384 A | 5/1990 |
| JP | H0670581 A | 3/1994 |
| JP | 2002-357268 A | 12/2002 |
| JP | 2003-148608 A | 5/2003 |
| JP | 2004056858 A | 2/2004 |
| JP | 2011117561 A | 6/2011 |

OTHER PUBLICATIONS

Communication dated Oct. 14, 2014, issued by the Japanese Patent Office in counterpart Application No. 2014019190.

* cited by examiner

*Primary Examiner* — Eduardo Colon Santana
*Assistant Examiner* — Cortez Cook
(74) *Attorney, Agent, or Firm* — Sughrue Mion, PLLC; Richard C. Turner

(57) ABSTRACT

An actuator control unit has a first pattern in which the energization phase is switched on every switching of pulse signals, and a second pattern in which, even when a switching timing of the energization phase due to the switching of the pulse signals exists, the energization phase is not switched during a predetermined period, and, in an acceleration period before a specific position in which the actual rotation angle position of the detent plate is going toward the target rotation angle position and then the rotation becomes stable, the energization phase is switched with the first pattern set, then, in a deceleration period after the specific position in which the rotation of the motor is stable and then the actual rotation angle position generally matches the target rotation angle position, the energization phase of the motor is switched with the second pattern set.

5 Claims, 12 Drawing Sheets

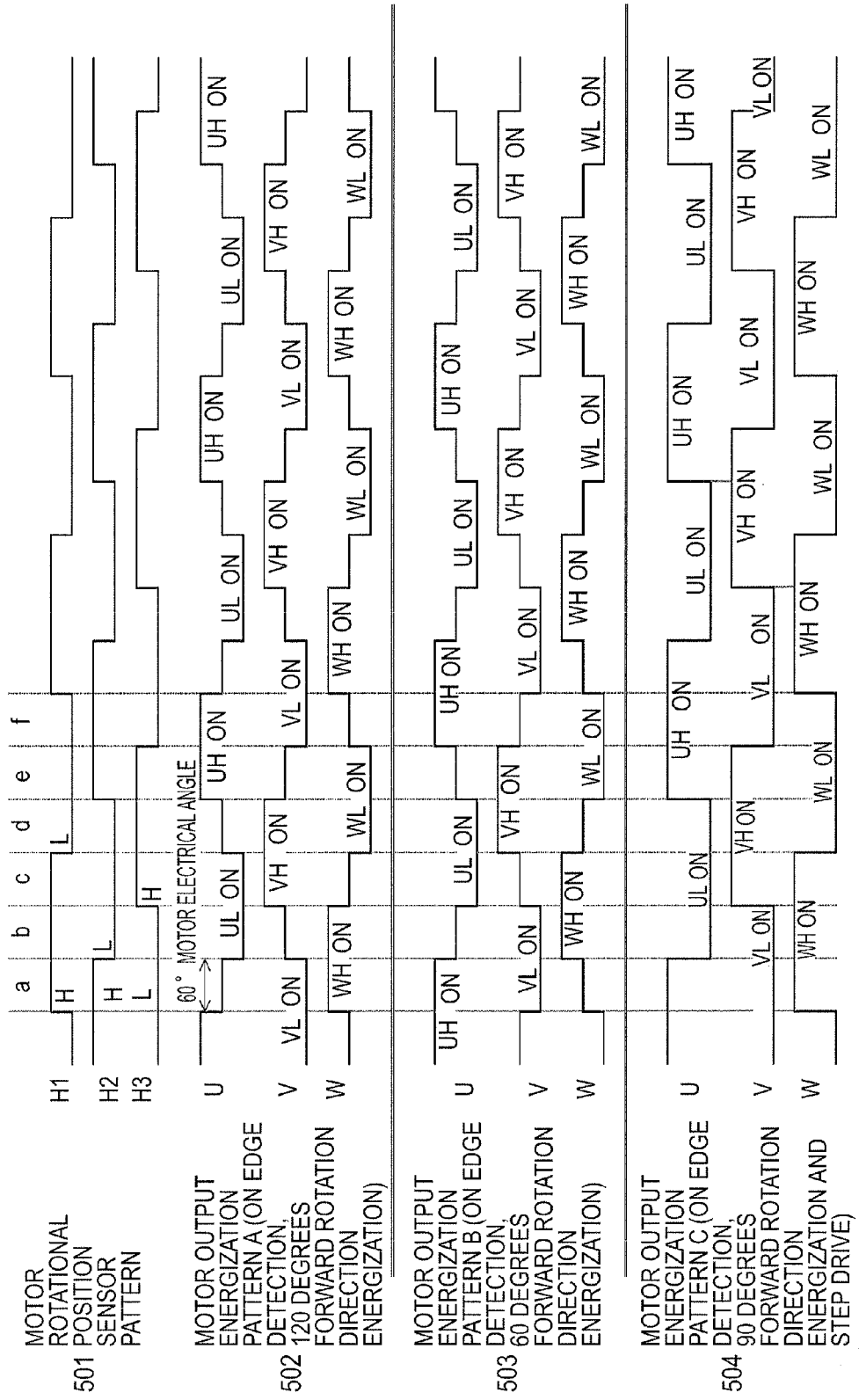

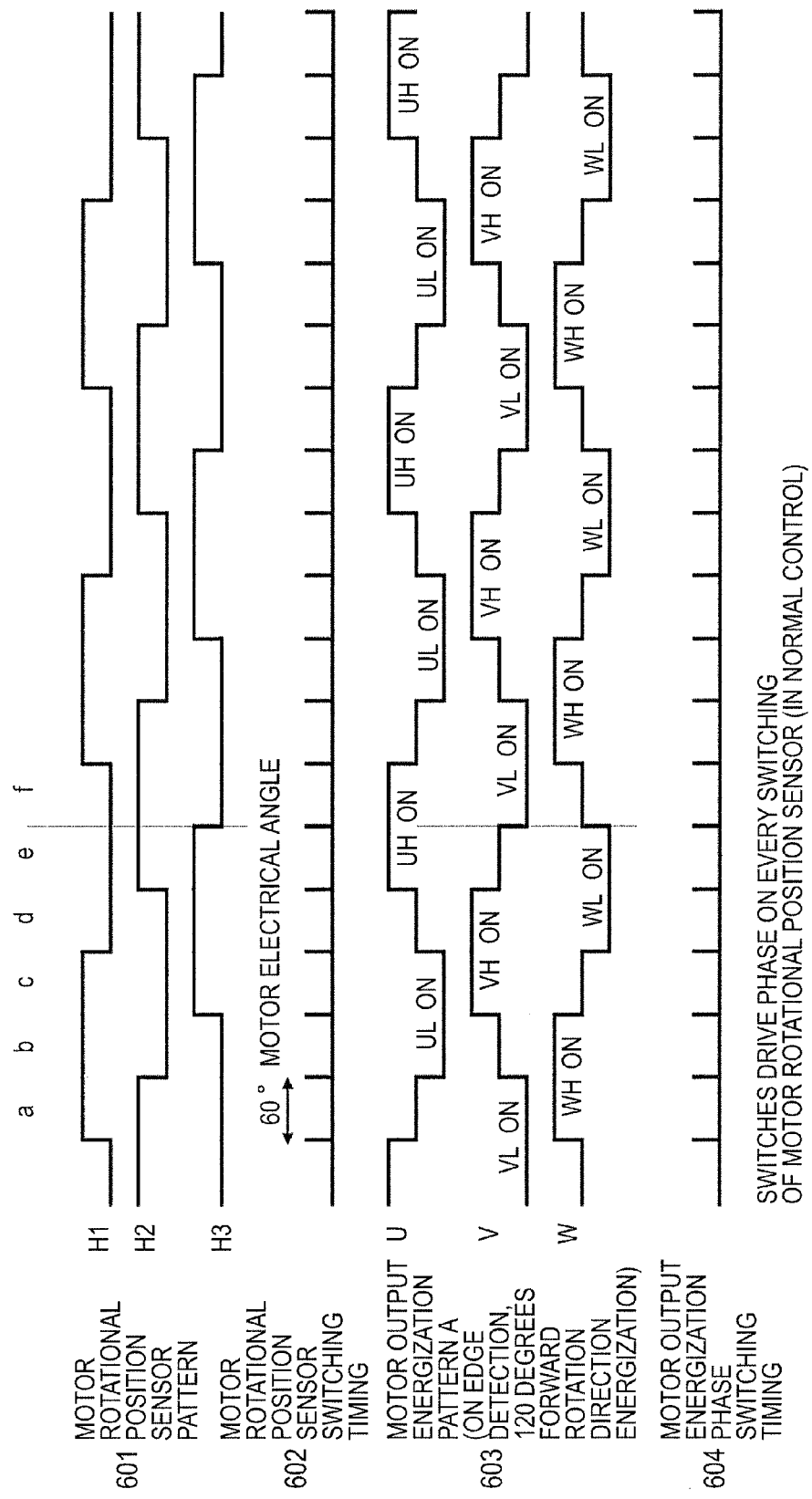

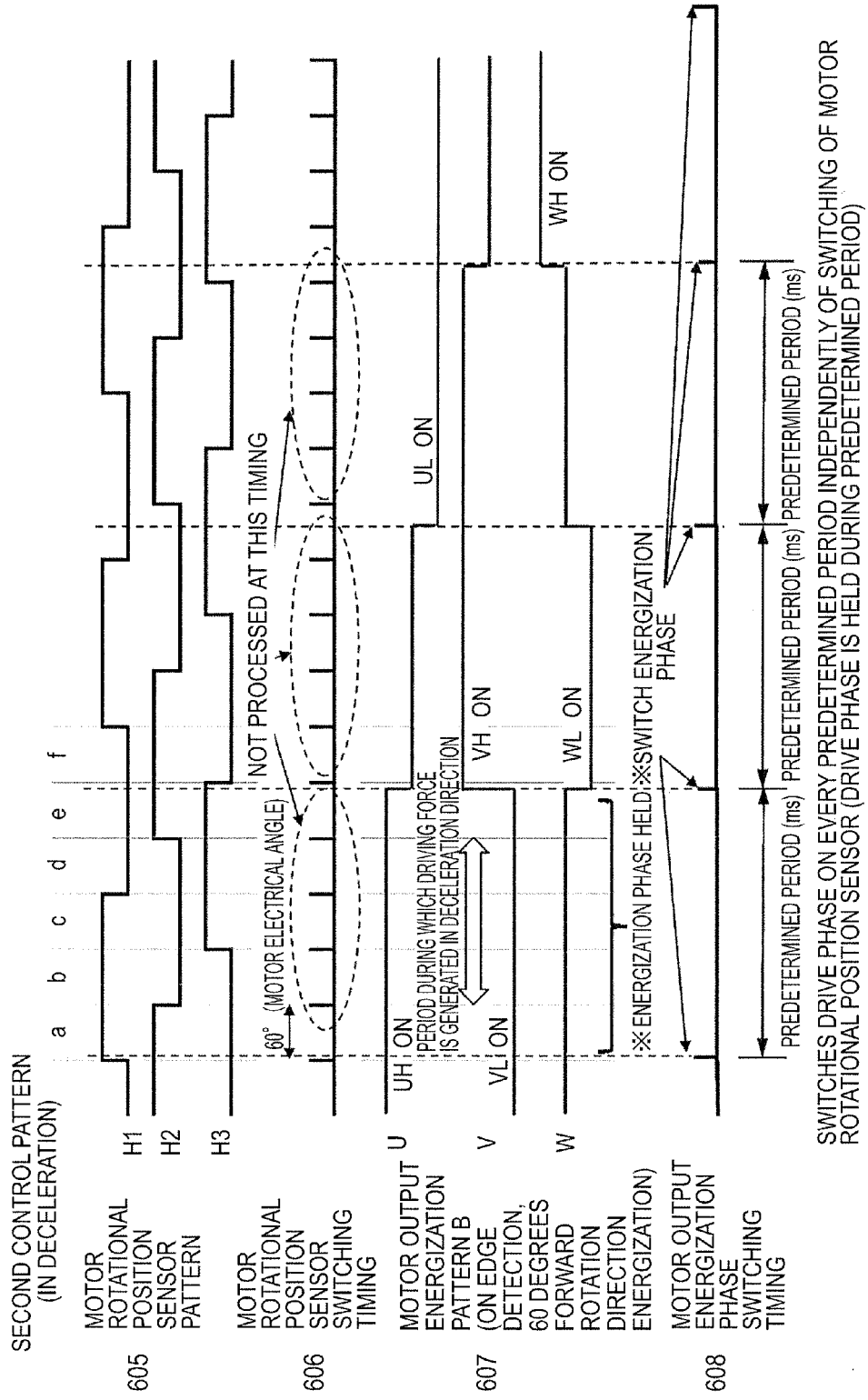

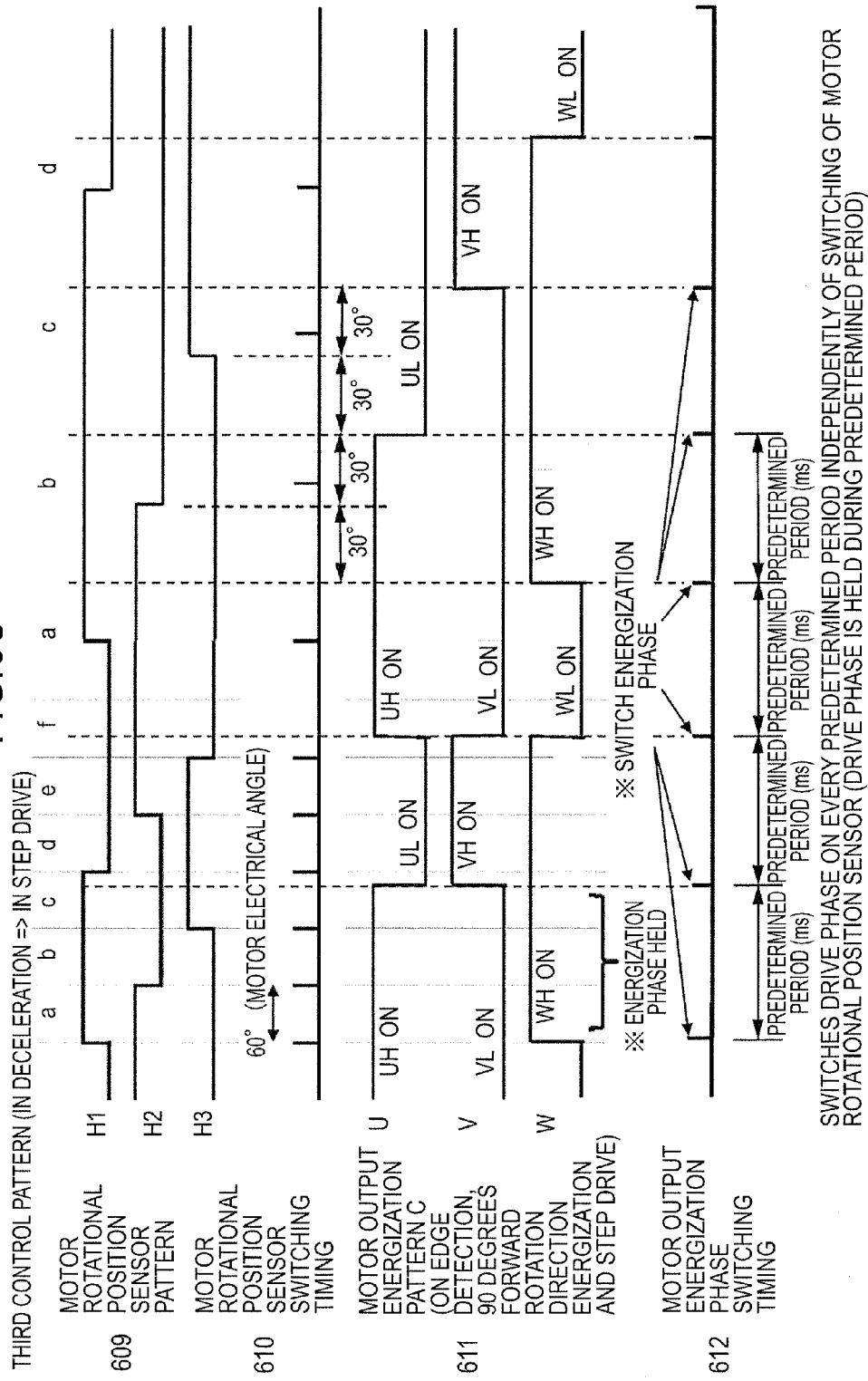

SHIFT RANGE SWITCHING APPARATUS

BACKGROUND OF THE INVENTION

1. Field of the Invention

The present invention relates to a shift range switching apparatus, and particularly relates to an electronically-controlled shift range switching apparatus that switches the shift range of an automatic transmission by driving an actuator.

2. Description of the Related Art

In recent years, an electronically-controlled shift range switching apparatus that switches the shift range of an automatic transmission by driving an actuator including an electric motor has been practically used. In such a shift range switching apparatus, when a driver selects a desired range from the P (Parking), R (Reverse), N (Neutral) and D (Drive) ranges by operating a shift lever as a gear shifting instruction member, a shift range switching mechanism (a mechanism that slidably displaces in a mechanical manner a manual spool valve for switching between hydraulic circuits in the automatic transmission depending on the shift range selection by the driver) switches between actual shift ranges of the automatic transmission. For this apparatus, a shift-by-wire system is provided that is configured to convert the information on the shift range selection by the driver into an electric signal, then drive a motor using the converted electric signal to switch the shift range switching mechanism.

In the shift-by-wire system, a detent mechanism is placed between the motor and the shift range switching mechanism. When the motor is driven, a rotary shaft is caused to rotate, then a detent plate coupled to the rotary shaft to form the detent mechanism is caused to rotate. At this time, a detent spring is positioned at a notch that is an engagement part formed in the detent plate in connection with each range, which positions the detent plate, thereby positioning the shift range switching mechanism.

In this configuration, in order to detect the position of the shift range switching mechanism, the rotational position of the detent plate is detected by a detent position sensor, then, based on the deviation of the actual rotational position detected by the detent position sensor from a preset target rotational position, feedback control is performed by an actuator controller.

For example, in a method disclosed in JP-A-2002-357268 (Patent Document 1), after the actuator is driven based on the deviation of the actual rotational position from the target rotational position, the actuator is driven at full power until reaching a certain position, then the actuator becomes servo-controlled to be driven until reaching the target position, in which, on switching from full power drive to servo-controlled drive, the actuator is rapidly decelerated by reverse control, then the actuator is driven to converge on the target position under fine tune control.

Furthermore, in a method disclosed in JP-A-2003-148608 (Patent Document 2), when the motor control is switched is detected depending on the change in the load torque of the motor detected by a torque sensor, and the control signal depending on the deviation of the actual rotational position from the target rotational position is corrected depending on the load torque.

[Patent Document 1] JP-A-2002-357268
[Patent Document 2] JP-A-2003-148608

According to the method disclosed in the Patent Document 1, in order to perform deceleration control by reverse drive, it is absolutely necessary to include an inhibiting process or an overcurrent protective circuit for preventing current from flowing through the motor drive circuit when the drive direction of the motor is changed from forward to reverse. Furthermore, since the load torque non-linearly varies depending on the detect mechanism and also varies depending on a combination of shift patterns or an environmental change, enormous man-hours is needed for adapting a feedback control parameter or setting a feedback control gain according to an operating characteristic of the actuator, the amount of load or the like.

Furthermore, according to the method disclosed in the Patent Document 2, optimum control can be performed even when the load torque non-linearly varies due to the detent mechanism, but an additional torque sensor is required, which increases the cost.

SUMMARY OF THE INVENTION

In view of the above problems, it is an object of the present invention to provide a shift range switching apparatus in which, in motor drive control for rotating the actual rotation angle position of a detent plate to a target rotation angle position, the actual rotation angle position can be caused to converge on the target rotation angle position with improved stability and inexpensive cost.

A shift range switching apparatus in accordance with the invention includes: an actuator for providing rotation output of a three-phase motor; a detent plate that is rotated by the rotation output of the actuator; a detent spring for holding the rotational position of the detent plate by engaging with one of a plurality of engagement parts provided in the detent plate; a shift range switching mechanism for switching the actual shift range of an automatic transmission according to the actual rotation angle position that is a rotational position of the detent plate held by the engagement of the detent spring with the engagement part; a detent position sensor for detecting the actual rotation angle position of the detent plate; an actual shift range determination unit for determining the actual shift range of the automatic transmission based on the actual rotation angle position detected by the detent position sensor; a shift range setting unit for outputting the requested shift range depending on the operation by a driver; a target rotation angle position calculation unit for calculating the target rotation angle position of the detent plate depending on the requested shift range output from the shift range setting unit; and an actuator control unit for driving the actuator so that the actual rotation angle position of the detent plate generally matches the target rotation angle position when the actual shift range determined by the actual shift range determination unit does not match the requested shift range, wherein the shift range switching apparatus includes a motor rotational position sensor for outputting a pulse signal in synchronization with the rotational position of the three-phase motor, and the actuator control unit controls switching of an energization phase of the three-phase motor based on pulse signals of the motor rotational position sensor, and also has, as a switching control pattern of the energization phase, a first control pattern in which the energization phase is switched on every switching of the pulse signals of the motor rotational position sensor, and a second control pattern in which, even when a switching timing of the energization phase due to the switching of the pulse signals of the motor rotational position sensor exists, the energization phase is not switched at least during a predetermined period longer than the switching period of the pulse signals of the motor rotational position sensor, and wherein in an acceleration period before a specific position in which the actual rotation angle position of the detent plate is going toward the target rotation angle position and then the rotation of the three-phase motor becomes stable, the energization phase is switched with the first control pattern set, then, in a deceleration period after the specific position in which the rotation of the three-phase motor is stable and then the actual rotation angle position generally matches the target rotation angle position, the energization phase is switched with the second control pattern set.

According to the shift range switching apparatus in accordance with the invention, reverse drive for deceleration is not performed and the three-phase motor is driven only in one direction, which eliminates the need for including an inhibiting process or an overcurrent protective circuit for preventing current from flowing through the motor drive circuit when the drive direction of the three-phase motor is changed from forward to reverse, allowing cost to be reduced. Furthermore, in deceleration, the three-phase motor is decelerated while the motor driving force is maintained without reducing motor current, and the three-phase motor is reliably step driven by constant degrees to the target rotation angle position while decelerating, which can simplify motor drive current feedback control, allowing man-hours for adaptation to be reduced and allows convergence on the target position without overshooting and undershooting.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 shows a relation between the output pattern of the motor rotational position sensor and the energization pattern of the motor drive circuit in accordance with the first embodiment of the invention;

FIG. 6A shows the motor energization phase switching timing and the energization phase pattern in accordance with the first embodiment of the invention;

FIG. 6B shows the motor energization phase switching timing and the energization phase pattern in accordance with the first embodiment of the invention;

FIG. 6C shows the motor energization phase switching timing and the energization phase pattern in accordance with the first embodiment of the invention;

DETAILED DESCRIPTION OF THE PREFERRED EMBODIMENTS

A suitable embodiment of a shift range switching apparatus in accordance with the present invention is described below with reference to the drawings.

First Embodiment

An electronically-controlled shift range switching apparatus is an apparatus in which a shift range selected by a driver (a requested shift range) is set to a target shift range, then an actuator is driven to change an actuated position of a shift range switching mechanism and a parking switching mechanism included in an automatic transmission, which switches a hydraulic controller in the automatic transmission to an oil passage corresponding to the target shift range, thereby switching the shift range of the automatic transmission.

Figure 1:
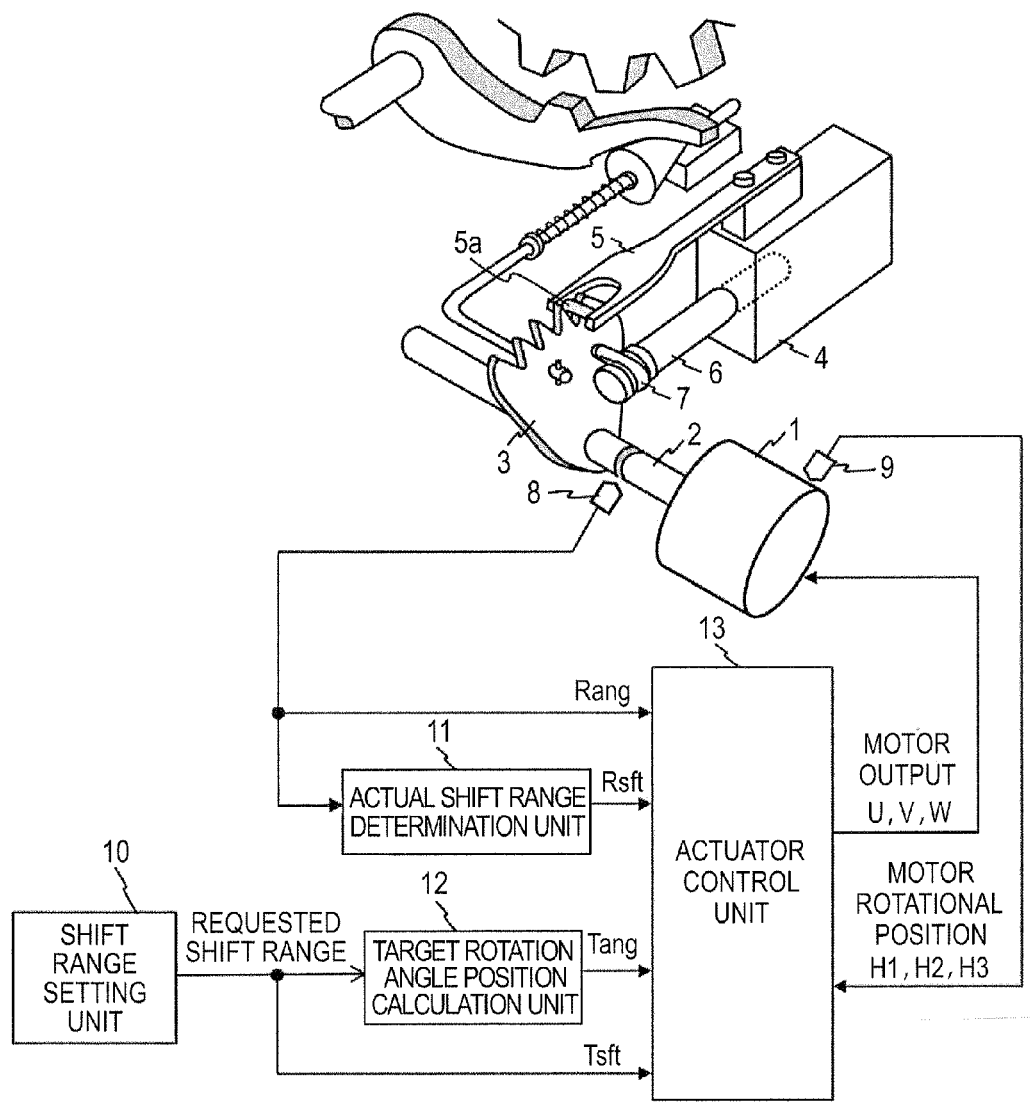
FIG. 1 is an overall configuration diagram for describing an overview of a shift range switching apparatus in accordance with a first embodiment of the invention.

FIG. 1 is an overall configuration diagram for describing an overview of a shift range switching apparatus in accordance with a first embodiment of the invention.

In FIG. 1, an actuator 1 includes a three-phase motor (not shown) and a reduction gear (not shown) for providing reduced rotation output of the three-phase motor, in which the rotation output of the actuator 1 is derived to the outside of the actuator 1 through a rotary shaft 2 that is coupled to an output shaft of the actuator 1 so as to extend the output shaft.

The rotary shaft 2 has a generally fan-shaped detent plate 3 mounted thereon. When the rotary shaft 2 is rotated by a predetermined angle by driving the actuator 1, the detent plate 3 is also rotated by the predetermined angle to a new rotational position with the junction between the rotary shaft 2 and the detent plate 3 as the center of rotation axis.

Figure 2:
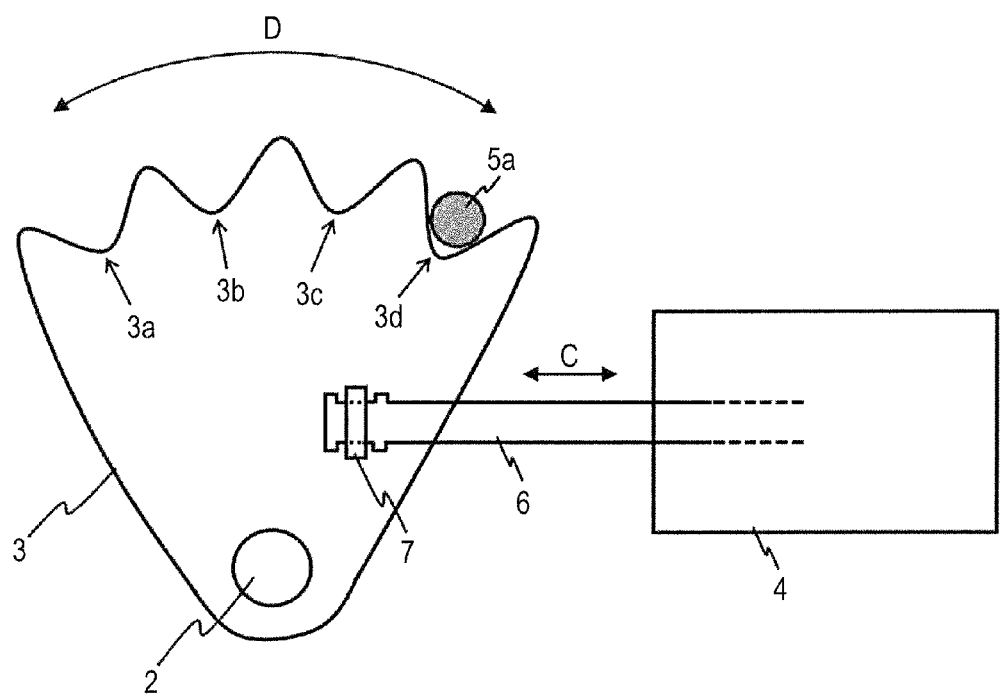
FIG. 2 is a view for describing the operation of a detent plate in the shift range switching apparatus in accordance with the first embodiment of the invention.

As enlargedly shown in FIG. 2, a plurality of notches as engagement parts are provided in the arc part of the detect plate 3, in which an engagement part 5a provided in the tip of a detent spring 5 fixed to a hydraulic controller 4 engages with one of the plurality of notches depending on the rotational position of the detent plate 3, thereby holding the rotational position of the detent plate 3.

Next, the operation of the detent plate 3 configured as above is described in detail with reference to FIG. 2.

FIG. 2 is an enlarged view for describing the operation of the detent plate 3. Four notches 3a, 3b, 3c, 3d are provided in the arc part of the generally fan-shaped detent plate 3, in which the engagement part 5a in the tip of the detent spring 5 engages with one of the four notches 3a, 3b, 3c, 3d depending on the rotational position of the detent plate 3, thereby holding the rotational position of the detent plate 3.

Generally, the four notches 3a, 3b, 3c, 3d provided in the detent plate 3 are predesigned as rotational positions at which the automatic transmission provides respective shift ranges including a P range (non-travel range and parking lock activated) at 3a, an R range (reverse travel range) at 3b, an N range (non-travel range) at 3c and a D range (forward travel range) at 3d.

Furthermore, a pin 7 for moving a shift range switching mechanism 6 is mounted on the side of the detent plate 3. The pin 7 is engaged with the tip (or the left end in FIG. 2) of the shift range switching mechanism 6, in which, when the rotary shaft 2 is rotated to rotate the detent plate 3, the pin 7 is driven to move in an arc, thereby causing the shift range switching mechanism 6 engaged with the pin 7 to move in a linear direction in the hydraulic controller 4 (in the direction of the double-headed arrow C in FIG. 2).

Note that, in FIGS. 1 and 2, the engagement part 5*a* in the tip of the detent spring 5 is engaged with the notch 3*d* provided at the rightmost position of the generally fan-shaped arc part of the detent plate 3, thereby holding the rotational position of the detent plate 3, with the state, in which the shift range switching mechanism 6 has been pushed into the hydraulic controller 4 at the smallest depth, then, in the hydraulic controller 4, an oil passage for providing the D range is configured, which causes the automatic transmission to be in the D range.

With the automatic transmission in the D range, when the rotary shaft 2 is rotated in the clockwise (right-handed) direction of the double-headed arrow D in FIG. 2 by a predetermined angle, synchronously causing the rotational position of the detent plate 3 to change, the engagement part 5*a* in the tip of the detent spring 5 leaves the notch 3*d* for the D range and moves into the notch 3*c* for the N range provided on the left of the notch 3*d* to hold the rotational position. With this state, the shift range switching mechanism 6 is further pushed into the hydraulic controller 4 at a depth more than that in the D range by a predetermined amount, then, in the hydraulic controller 4, an oil passage for providing the N range is configured, which causes the automatic transmission to be in the N range.

With the automatic transmission in the N range, when the rotary shaft 2 is further rotated in the clockwise (right-handed) direction of the double-headed arrow D in FIG. 2 by a predetermined angle, synchronously causing the rotational position of the detent plate 3 to change, the engagement part 5*a* in the tip of the detent spring 5 leaves the notch 3*c* for the N range and moves into the notch 3*b* for the R range provided on the left of the notch 3*c* to hold the rotational position. With this state, the shift range switching mechanism 6 is further pushed into the hydraulic controller 4 at a depth more than that in the N range by a predetermined amount, then, in the hydraulic controller 4, an oil passage for providing the R range is configured, which causes the automatic transmission to be in the R range.

With the automatic transmission in the R range, when the rotary shaft 2 is further rotated in the clockwise (right-handed) direction of the double-headed arrow D in FIG. 2 by a predetermined angle, synchronously causing the rotational position of the detent plate 3 to change, the engagement part 5*a* in the tip of the detent spring 5 leaves the notch 3*b* for the R range and moves into the notch 3*a* for the P range provided on the left of the notch 3*b* to hold the rotational position. With this state, the shift range switching mechanism 6 is further pushed into the hydraulic controller 4 at a depth more than that in the R range by a predetermined amount, then, in the hydraulic controller 4, an oil passage for providing the P range is configured, which causes the automatic transmission to be in the P range.

In this way, as the shift range switching mechanism 6 is gradually pushed into the hydraulic controller 4 by the detent plate 3, the oil passage in the hydraulic controller 4 is switched to the D, N, R and P range in this order, causing the shift range of the automatic transmission to be in the D, N, R and P range in this order.

Note that, when the rotary shaft 2 is rotated in the reverse direction with respect to the above, i.e., the counterclockwise (left-handed) direction of the double-headed arrow D in FIG. 2, in turn, as the shift range switching mechanism 6 is gradually pulled out from within the hydraulic controller 4 by the detent plate 3, the oil passage in the hydraulic controller 4 is switched to the P, R, N and D range in this order, causing the shift range of the automatic transmission to be in the P, R, N and D range in this order.

As described above, the shift range switching mechanism 6 is driven by the rotation output of the actuator 1 to switch the shift range of the automatic transmission, and the switching between the shift ranges (P, R, N and D ranges) of the automatic transmission is performed by slidably displacing the shift range switching mechanism 6 provided in the hydraulic controller 4 to a position for each shift range to switch the oil passage in the automatic transmission.

Next, the configuration and function of the electronic control system of the shift range switching apparatus is described with reference to the overall configuration diagram in FIG. 1 and a block diagram in FIG. 3.

In addition to the already-described actuator 1, the electronic control system of the shift range switching apparatus has components including a detent position sensor 8, a motor rotational position sensor 9, a shift range setting unit 10, an actual shift range determination unit 11, a target rotation angle position calculation unit 12 and an actuator control unit 13. As described above, the actuator 1 includes a three-phase brushless motor (hereinafter referred to as a motor) 14 and a reduction gear 15. Rotation of the rotary shaft 2 coupled to the reduction gear 15 causes the detent plate 3 coupled to the rotary shaft 2 to rotate.

The detent position sensor 8 is a detection unit for outputting a signal corresponding to an actual rotation angle position Rang of the detent plate 3. The motor rotational position sensor 9 is a detection unit for outputting a signal corresponding to the rotational position of the motor 14, with a detection device utilizing the Hall effect generally employed. The actual shift range determination unit 11 receives as an input the actual rotation angle position Rang of the detent plate 3 detected by the detent position sensor 8 and determines an actual shift range Rsft from the P, R, N and D ranges based on the actual rotation angle position Rang to output the determination result.

The shift range setting unit 10 is an input device with a push button, a jog lever or the like employed, which outputs a requested shift range Tsft when operated by a driver. The target rotation angle position calculation unit 12 receives as an input the requested shift range Tsft output by the shift range setting unit 10 and calculates and outputs a target rotation angle position Tang of the detent plate 3 corresponding to the requested shift range Tsft.

The actuator control unit 13 receives as an input the actual rotation angle position Rang of the detent plate 3 detected by the detent position sensor 8, the actual shift range Rsft determined by the actual shift range determination unit 11, the requested shift range Tsft output by the shift range setting unit 10, the target rotation angle position Tang calculated by the target rotation angle position calculation unit 12 and pulse signals H1, H2, H3 in synchronization with the motor rotational position output by the motor rotational position sensor 9.

In the actuator control unit 13, a deviation calculation unit 16 calculates the deviation of the actual rotation angle position Rang from the target rotation angle position Tang and outputs the calculated deviation to a control mode determination unit 17. Base on the input of the requested shift range Tsft and actual shift range Rsft and the deviation calculated by the deviation calculation unit 16, the control mode determination unit 17 determines the control mode such as driving or braking, drive direction or performing of feedback control of the motor 14.

Next, depending on the control mode determined by the control mode determination unit 17, a motor control condition setting unit 18 sets a motor drive duty (amount of motor current), rotation direction, activation of braking control of grounding all phases and the like, then outputs the settings to a motor drive circuit control unit 19. Depending on the position of the motor 14 determined by a motor rotational position determination unit 20, the motor drive circuit control unit 19 outputs a control signal to a motor drive circuit 21 so as to drive the motor 14 with the conditions set by the motor control condition setting unit 18, then the motor 14 is driven by the motor drive circuit 21.

Then, the motor 14 is controlled by motor control outputs U, V, W, then the actuator 1 is driven so that the actual rotation angle position Rang of the detent plate 3 will match the target rotation angle position Tang. Then, when the actual rotation angle position Rang falls within a predetermined range from the target rotation angle position Tang and the actual shift range Rsft matches the requested shift range Tsft, the motor 14 is braked to stop driving the actuator 1.

In this way, the actual shift range of the automatic transmission is switched to the requested shift range selected by the driver. Note that the actuator control unit 13 also includes a motor rotational position sensor switching period calculation unit 22, a motor energization phase switching period setting unit 23 and a motor energization phase control pattern setting unit 24. The motor rotational position sensor switching period calculation unit 22 calculates the switching period detected by the motor rotational position sensor 9. The values set by the motor energization phase switching period setting unit 23 and the motor energization phase control pattern setting unit 24 are output to the motor drive circuit control unit 19. The motor rotational position sensor switching period calculation unit 22, the motor energization phase switching period setting unit 23 and the motor energization phase control pattern setting unit 24 are a featured part of the shift range switching apparatus in accordance with the first embodiment, which is described in detail later.

Next, the drive unit of the motor 14 is described with reference to FIGS. 4 and 5.

Figure 4:
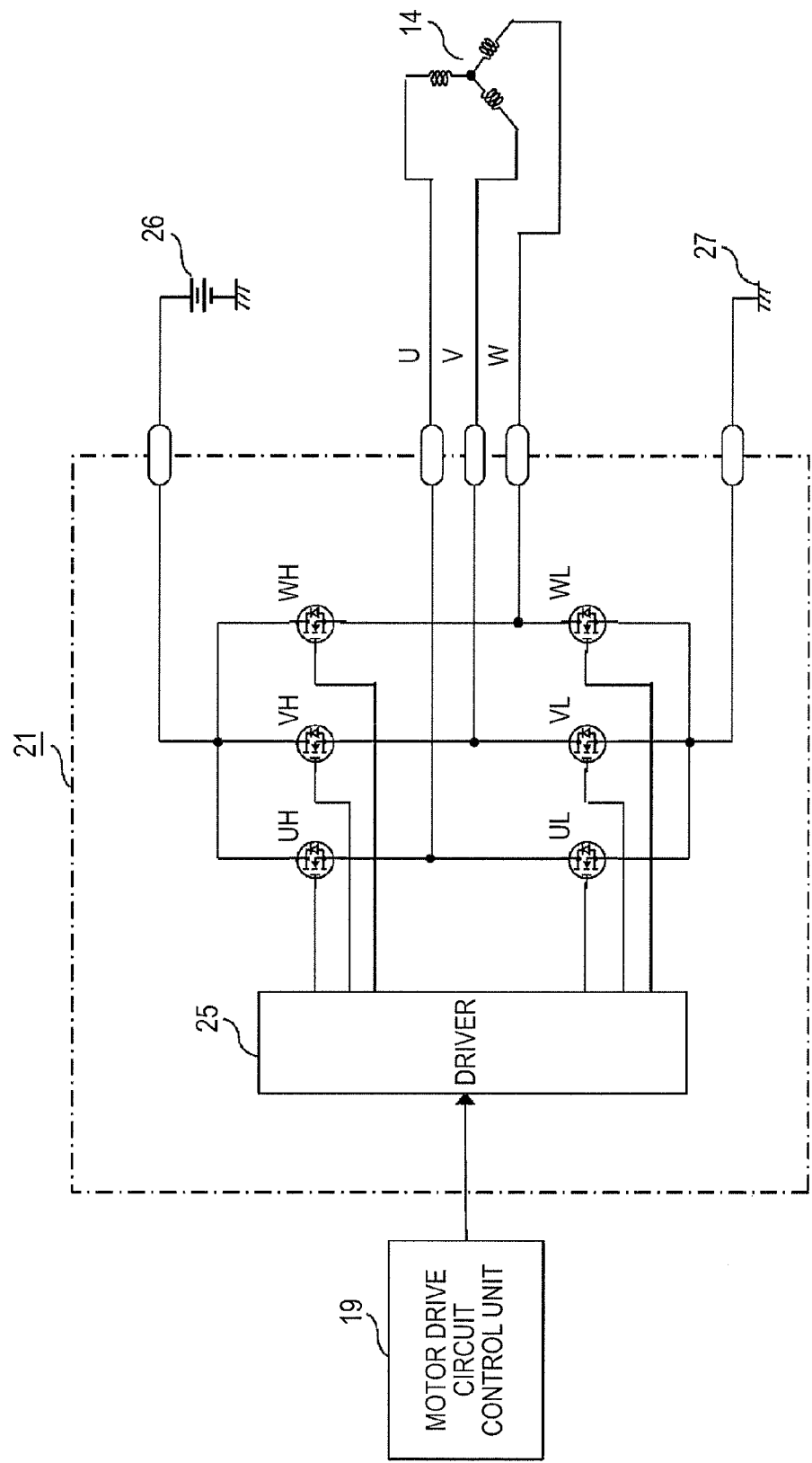
FIG. 4 is a motor drive circuit diagram in accordance with the first embodiment of the invention.

FIG. 4 shows the motor drive circuit 21 in detail. A driver 25 receives as an input a control signal from the motor drive circuit control unit 19. The motor 14 (U, V, W phases), a DC power supply 26 and a GND 27 are externally connected to the motor drive circuit 21. The motor drive circuit 21 includes six FETs UH, UL, VH, VL, WH, WL forming an inverter. The driver 25 causes the FETs UH, VH, WH to switch energization between the DC power supply 26 and the phases (U, V, W phases) of the motor 14, and causes the FETs UL, VL, WL to switch energization between the GND 27 and the phases of the motor 14. Then, the energization pattern to the phases of the motor 14 is switched depending on the combination of the six FETs UH, UL, VH, VL, WH, WL.

FIG. 5 shows a relation between the output pattern of the motor rotational position sensor 9 and the energization pattern of the motor drive circuit 21 in the first embodiment.

In FIG. 5, a motor rotational position sensor pattern 501 shows an example of the output pattern of the sensors H1, H2, H3 when the motor 14 is caused to rotate clockwise. The sensors H1, H2, H3, each outputting a high level H or low level L, iteratively output six patterns a to f in this order depending on the rotation angle of the motor 14. The period during which the same pattern is being output corresponds to 60 degrees of the electrical angle of the motor 14. A motor output energization pattern A 502, a motor output energization pattern B 503 and a motor output energization pattern C 504 show energization patterns of the motor drive circuit 21 for the motor rotational position sensor pattern 501, showing how the FETs for the phases are driven.

For the motor output energization pattern A 502, for example, in the pattern a, when the motor rotational position sensor pattern 501 is H1, H2, H3=H, H, L, the FETs WH and VL of the motor drive circuit 21 are turned on. In the pattern b, when the motor rotational position sensor pattern 501 is H1, H2, H3=H, L, L, the FETs WH and UL of the motor drive circuit 21 are turned on.

In this way, for the motor rotational position sensor pattern 501, the FET energization pattern of the motor drive circuit 21 is sequentially switched so that a magnetic force for causing 120 degrees forward rotation is generated when the sensor output pattern changes, which generates the drive power of the motor 14.

For the motor output energization pattern B 503, with respect to the motor output energization pattern A 502, the FET energization pattern is delayed by 60 degrees, and the energization pattern when the sensor output pattern changes is changed from 120 degrees forward to 60 degrees forward. For the motor output energization pattern C 504, the energization phase of each pattern of the motor rotational position sensor 9 is changed from two phases to three phases with an energization angle of each phase of 180 degrees, and the energization pattern when the sensor output pattern changes is changed to 90 degrees forward.

The motor output energization pattern A 502 is a typical energization pattern when a three-phase brushless motor is driven, in which, in deceleration, the motor drive duty is reduced to reduce the motor current, thereby reducing the motor torque. The feedback control of the actual rotation angle position Rang with respect to the target rotation angle position Tang is performed by adjusting the motor drive duty or switching to the reverse drive energization pattern for deceleration. Up to here, the actuator control by the conventional control method has been described.

Next, the configuration and control of the motor rotational position sensor switching period calculation unit 22, the motor energization phase switching period setting unit 23 and the motor energization phase control pattern setting unit 24, which are the featured part of the first embodiment, is described.

Figure 3:
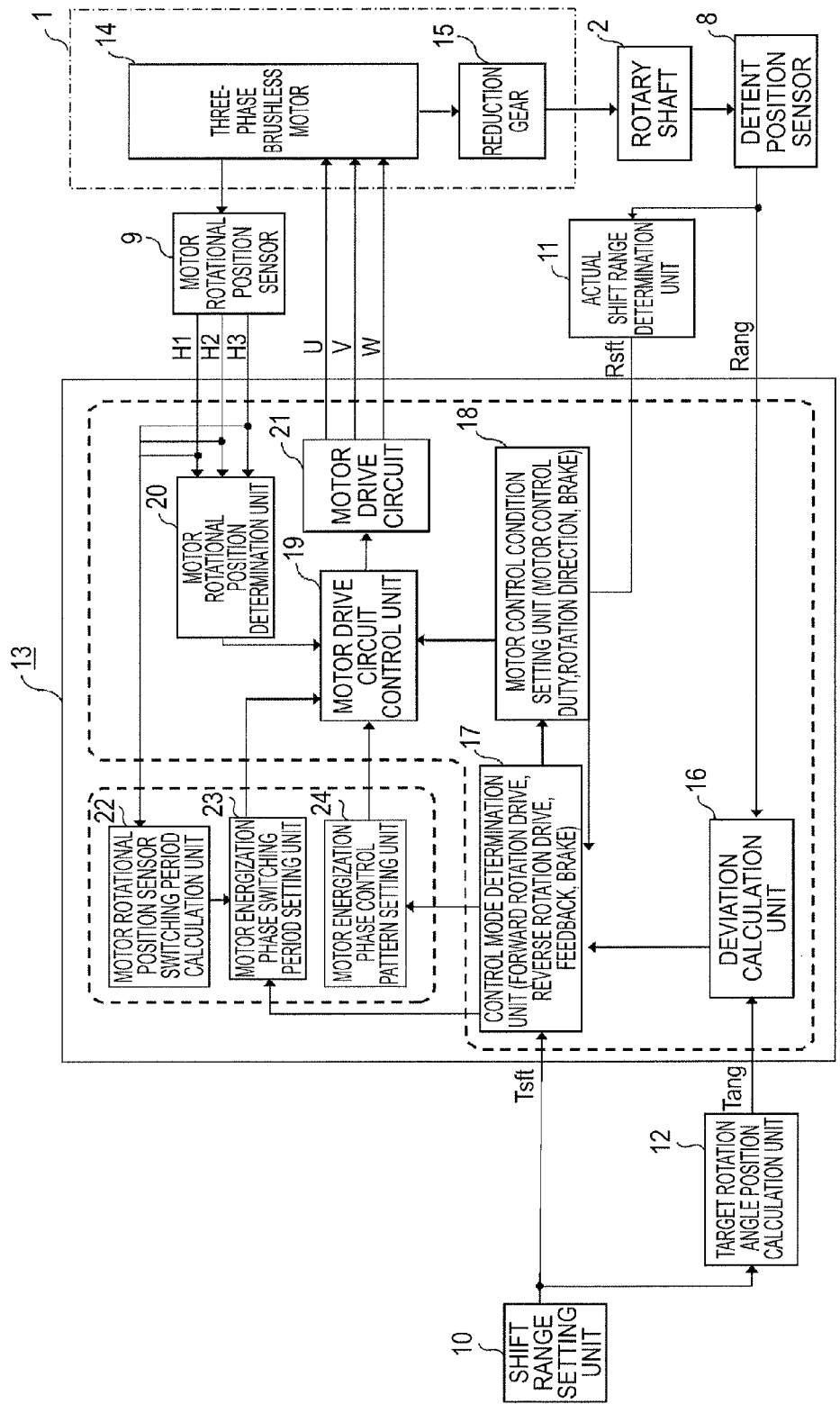
FIG. 3 is a block diagram showing an overview of the shift range switching apparatus in accordance with the first embodiment of the invention.

In FIG. 3, the motor rotational position sensor switching period calculation unit 22 calculates the switching period of the pulse signals H1, H2, H3 in synchronization with the motor rotational position, output by the motor rotational position sensor 9. The motor energization phase switching period setting unit 23 sets the switching period of the motor energization phase and outputs it to the motor drive circuit control unit 19 based on the period calculated by the motor rotational position sensor switching period calculation unit 22 and the control mode determined by the control mode determination unit 17. The motor energization phase control pattern setting unit 24, based on the control mode determined by the control mode determination unit 17, switches the motor energization phase control pattern from the first control pattern of the motor output energization pattern A 502 to the second control pattern of the motor output energization pattern B 503 and the third control pattern of the motor output energization pattern C 504 and outputs it to the motor drive circuit control unit 19.

FIGS. 6A, 6B and 6C show the motor energization phase switching timing and the energization phase pattern. In FIGS. 6A to 6C, motor rotational position sensor patterns 601-612 and motor output energization patterns A, B, C are similar to those shown in FIG. 5, and switching timings of the motor rotational position sensor 9 are denoted by 602, 606, 610. Switching timings of the motor output energization phase in the motor output energization patterns A, B, C, i.e., the first, second, third control patterns are denoted by 604, 608, 612.

In the first control pattern, at each switching timing 602 of the motor rotational position sensor 9, the energization phase of the motor 14 is switched in the pattern of the motor output energization pattern A 603 to drive the motor 14 to accelerate.

In the second control pattern, during a predetermined period of the motor energization phase switching timing 608, the energization phase is not switched but held even when the motor rotational position sensor switching timing 606 exists, then the energization phase is switched every the predetermined period in the pattern of the motor output energization pattern B 503. By doing so, after switching the motor output energization pattern, a driving force is generated in the forward rotation direction until a next motor rotational position sensor switching timing, but, during a period of 180 degrees after that, the energization phase is still held, so a driving force is generated in deceleration. The predetermined period is set to be longer than the motor rotational position sensor switching timing so as to include a time period in which a driving force is generated in deceleration, which causes the motor to decelerate.

In the third control pattern, during a predetermined period of the motor energization phase switching timing 612, the energization phase is not switched even when the motor rotational position sensor switching timing 610 exists, then the energization phase is switched every the predetermined period in the pattern of the motor output energization pattern B 503, which drives the motor 14 using the attraction force of the magnet. At this time, the motor drive duty is not reduced but maintained so that the attraction force can be kept, which drives the motor 14 while, on every switching the motor output energization phase, stopping the motor at a stable position in the drive pattern held during the predetermined period.

Furthermore, in the second control pattern, deceleration progresses such that one energization phase switching causes a step rotation by 60 degrees. So, when the motor stops just before the switching of the motor rotational position sensor signal, a motor rotational position sensor signal pulse is not generated, so the motor energization phase is not switched after the predetermined period, which may cause the motor 14 to remain stopped. Accordingly, the control pattern is switched from the second control pattern to the third control pattern depending on the deviation of the actual rotation angle position from the target rotation angle position so that, just before the actual rotation angle position reaches the target rotation angle position, the energization phase of the motor 14 is switched in an energization pattern in which a motor rotational position sensor signal pulse is generated whenever the motor is rotated by 60 degrees. This prevents the motor 14 from remaining stopped as described above and allows the motor 14 to be reliably step driven by 60 degrees even when the motor 14 is decelerated just before stopping.

Figure 7:
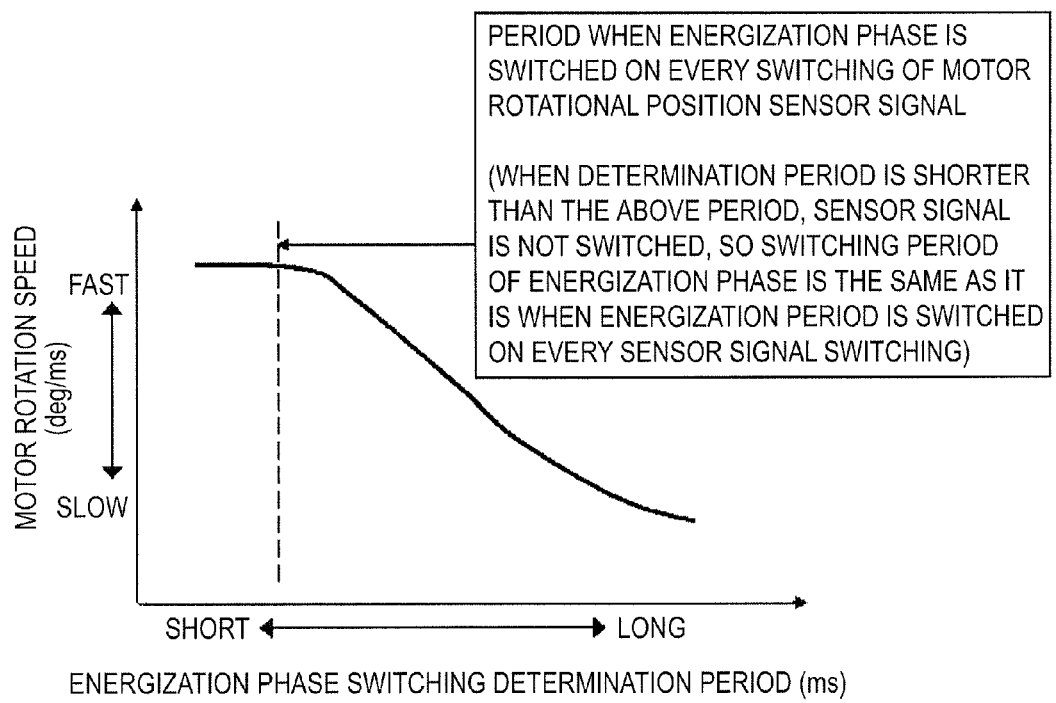
FIG. 7 shows a relation between the energization phase switching determination period and the motor rotation speed of the shift range switching apparatus in accordance with the first embodiment of the invention.

FIG. 7 shows a relation between the energization phase switching determination period and the motor rotation speed. As shown, as the energization phase switching determination period increases, the motor rotation speed tends to decrease. However, when the energization phase switching determination period is set to be shorter than the motor rotational position sensor switching period, the motor rotation speed is the same as that when the energization phase is switched in synchronization with the switching of the motor rotational position sensor 9. Accordingly, the predetermined period is set to be at least longer than the pulse signal switching period of the motor rotational position sensor 9 when a specific position is determined.

Furthermore, in the second control pattern, as the deviation of the actual rotation angle position from the target rotation angle position decreases, the predetermined period is set to be longer to increase deceleration, which can further improve convergence on the target rotation angle position. Also, at this time, as the motor drive duty is increased, the attraction force during the energization phase hold period increases, increasing deceleration effect, so an optimum motor drive duty should be set in order to obtain a desired deceleration effect.

In the second control pattern, the energization phase is held during the predetermined period, which provides the energization pattern in deceleration during the 180 degrees of inertia rotation and obtains deceleration effect. In addition, the motor output energization pattern B 503 that is 60 degrees delayed from the motor output energization pattern A 502 is used to obtain further deceleration effect from 60 degrees advance in the timing of the energization pattern in deceleration during inertia rotation. However, when one or more times of inertia rotation exist in the period during which the energization phase is held, the effect of the 60 degrees delayed energization pattern is reduced. So, depending on the motor rotational position sensor switching timing 606, the predetermined period is set so that further deceleration effect can be obtained, by setting the period during which the energization phase is held to an optimum value (e.g., a period from 60 to 240 degrees or so, because the period of 60 to 180 degrees is in deceleration).

In the conventional control, the motor 14 is driven in the first control pattern both in acceleration and deceleration, and, in deceleration, the motor drive duty is reduced or the energization pattern is switched to that of reverse drive to perform rapid braking. However, as described in the Patent Document 1, in order to perform deceleration control by reverse drive, as a problem, it is absolutely necessary to include an inhibiting process or an overcurrent protective circuit for preventing current from flowing through the motor drive circuit 21 when the drive direction of the motor 14 is switched from forward to reverse, and furthermore, since the load torque non-linearly varies depending on the detent mechanism and also varies depending on a combination of shift patterns or an environmental change, enormous manhours is needed for adapting a feedback control parameter or setting a feedback control gain according to an operating characteristic of the actuator 1, the amount of load or the like.

Figure 8:
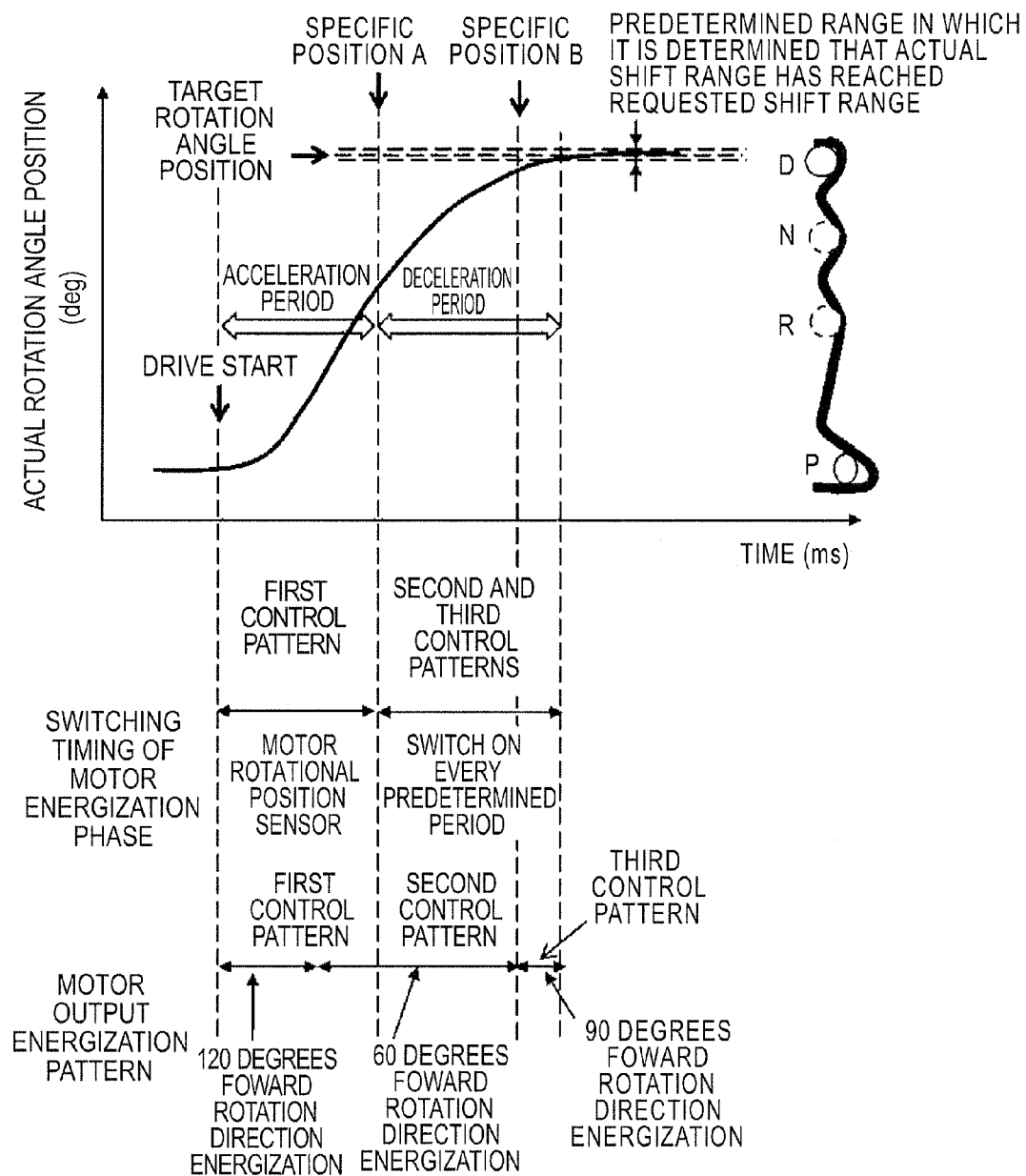
FIG. 8 shows an operation example of the target rotation angle position and the actual rotation angle position in accordance with the first embodiment of the invention.

On the other hand, in this embodiment, in deceleration, the motor 14 is caused to operate without reverse drive. FIG. 8 shows an operation example of the target rotation angle position and the actual rotation angle position in accordance with the first embodiment.

In FIG. 8, in an acceleration period from immediately after the motor drive start caused by starting control toward a target shift to a specific position A at which the rotation of the motor 14 is stable, with the first control pattern set, the energization phase of the motor 14 is switched to drive the motor 14 by control capable of maximum acceleration, then, in a deceleration period from the specific position A to a specific position B, with the second control pattern set, the energization phase of the motor 14 is switched to drive the motor 14 to approach the target rotation angle position while decelerating, without being switched to the reverse drive energization pattern. The specific position A is preset for each combination of the actual shift range and the requested shift range. The specific position A may be changed depending on the deviation of the actual rotation angle position from the target rotation angle position. Furthermore, from the specific position B till when the actual rotation angle position enters within a predetermined range from the target rotation angle position, with the third control pattern set, the energization phase of the motor 14 is switched to drive the motor 14 to reliably approach the target rotation angle position even just before the motor 14 stops, which can further improve convergence on the target position. The specific position B is set depending on the deviation of the actual rotation angle position from the target rotation angle position.

Furthermore, with a certain combination of the actual shift range and the requested shift range, that is, even when the acceleration period in the first control pattern is not set and the motor 14 is driven only in the second and third control patterns, if a range switching condition with a small operational rotation angle that can satisfy a requirement on time for reaching the target rotation angle position (shift to the next range, such as N range to D range or R range to N range) is selected, the switching of the motor energization phase with the first control pattern set is not performed, but the switching of the motor energization phase with the second control pattern set is performed first. This can further improve convergence on the target rotation angle position.

Next, a method for controlling the shift range switching apparatus in accordance with the first embodiment described above is described with reference to the flowcharts shown in FIGS. 9 and 10.

Figure 9:
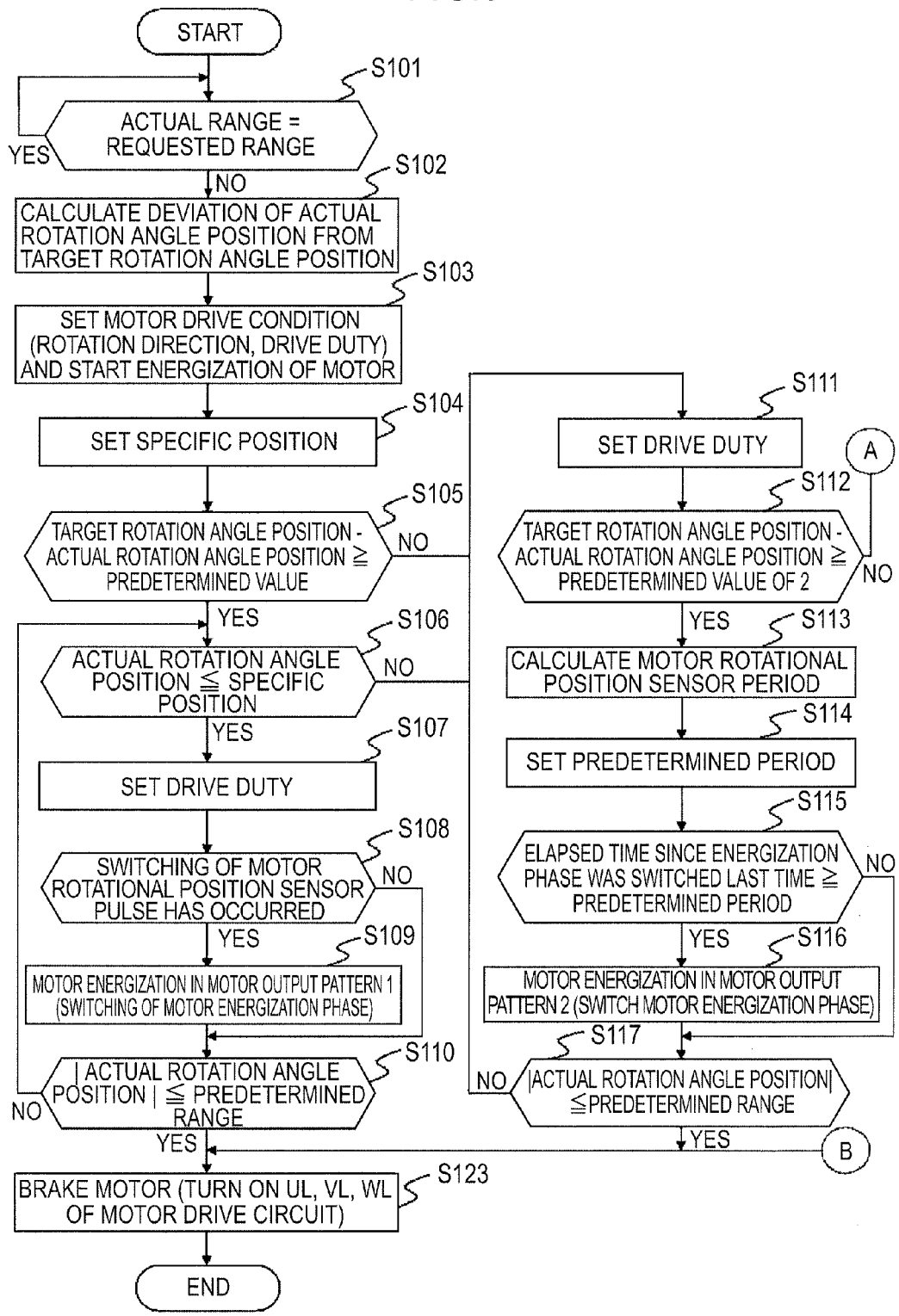
FIG. 9 is a flowchart for describing a method for controlling the shift range switching apparatus in accordance with the first embodiment of the invention.
Figure 10:
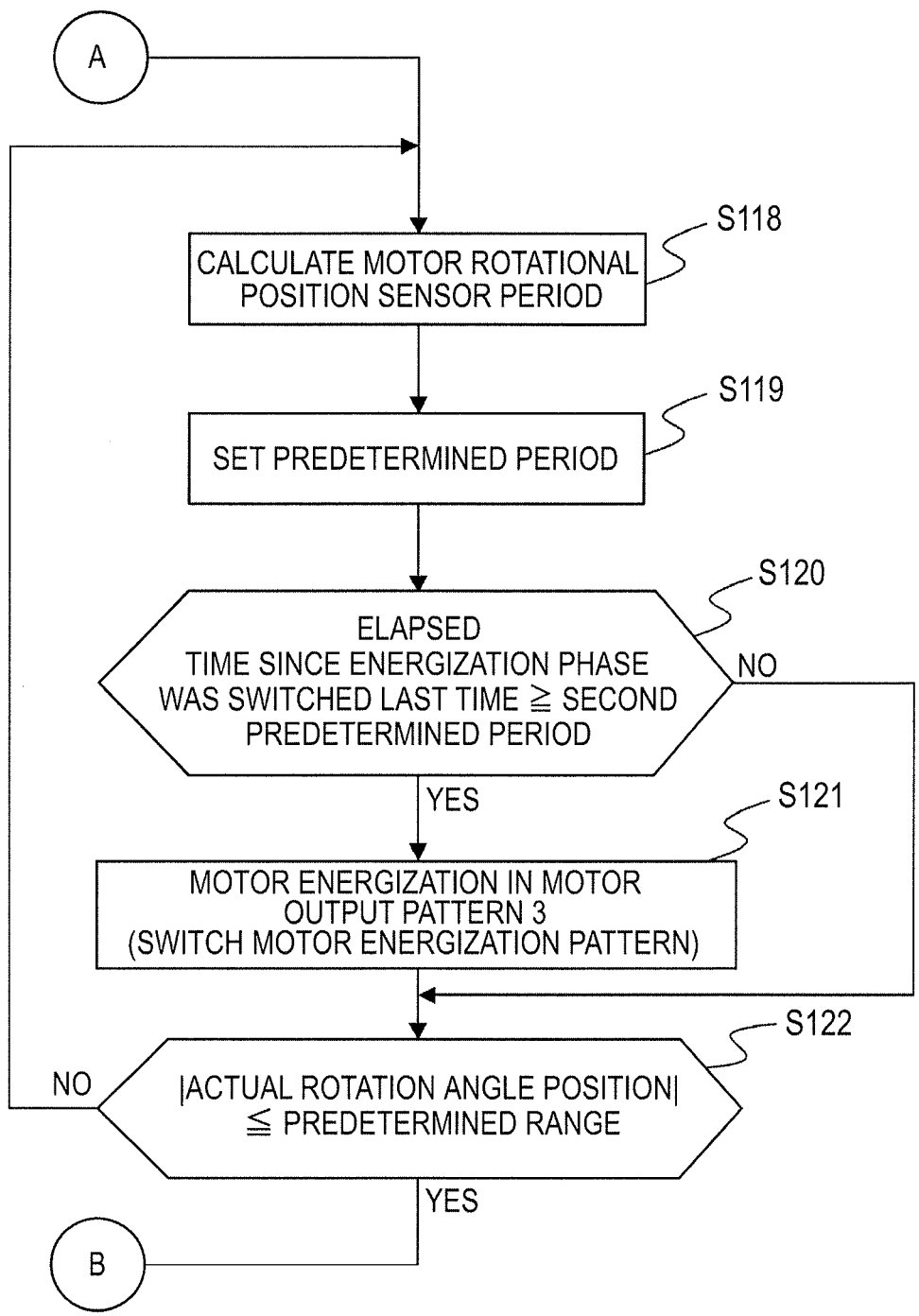
FIG. 10 is a flowchart for describing the method for controlling the shift range switching apparatus in accordance with the first embodiment of the invention.

Referring to FIGS. 9 and 10, in step S101, the control mode determination unit 17 determines whether or not the actual shift range determined by the actual shift range determination unit 11 matches the requested shift range output by the shift range setting unit 10. If Yes, the determination of the step S101 is repeated. If No, it is determined that a range switching request has occurred, then the process proceeds to step S102.

In the step S102, the deviation calculation unit 16 calculates the deviation of the actual rotation angle position detected by the detent position sensor 8 from the target rotation angle position calculated by the target rotation angle position calculation unit 12, then the process proceeds to step S103.

Next, in the step S103, the control mode determination unit 17 determines the rotation direction of the motor 14 from the actual shift range and the requested shift range, and sets the motor drive duty depending on the deviation of the actual rotation angle position from the target rotation angle position calculated in the step S102. Then, with the first control pattern set as shown by the motor output energization pattern A 502 in FIG. 5, the energization of the motor 14 is started according to the signal pattern of the motor rotational position sensor 9.

In step S104, the specific position A at which the control pattern is switched from the first control pattern to the second control pattern is set. For the specific position A, data is predetermined for each combination of the actual shift range and the requested shift range.

In step S105, in order to determine whether or not the actual shift range and the requested shift range are a specific combination, it is determined whether or not the deviation of the actual rotation angle position from the target rotation angle position is equal to or greater than a predetermined value. If Yes, the process proceeds to step S106. If No, the process proceeds to step S111. The predetermined value is preset to a value with which it can be determined that the operational rotation angle is so small that the requirement on time for reaching the target rotation angle position can be satisfied even at a low rotation speed.

Next, in the step S106, it is determined whether or not the actual rotation angle position has reached the specific position A set in the step S104. If Yes, the process proceeds to the step S111 to switch the energization phase switching of the motor 14 to the setting in the second control pattern shown by the motor output energization pattern B 503 in FIG. 5. If No, the process proceeds to step S107. Note that the steps S103 to S106 are performed by the motor energization phase control pattern setting unit 24.

In the step S107, the motor control condition setting unit 18 sets the drive duty of the motor 14 depending on the deviation of the actual rotation angle position from the target rotation angle position.

Next, in step S108, the motor rotational position determination unit 20 determines whether or not a switching of the pulse signal of the motor rotational position sensor 9 has occurred. If Yes, the process proceeds to step S109 to switch the energization phase of the motor 14 with the motor output energization pattern A 603 in FIG. 6A set. If No (no switching of the pulse signal of the motor rotational position sensor 9 has occurred), the process proceeds to step S110 without switching the energization phase of the motor 14.

In the step S110, it is determined whether or not the actual rotation angle position has entered within a predetermined range from the target rotation angle position. If Yes, the process proceeds to step S123. If No, the process returns to the step S106 to continue motor drive. The predetermined range is defined as the range of the actual rotation angle position in which it is determined that the actual shift range has matched the requested shift range, with a margin.

In the step S111, the motor control condition setting unit 18 sets the drive duty of the motor 14 depending on the deviation of the actual rotation angle position from the target rotation angle position. In step 112, it is determined whether or not the deviation of the actual rotation angle position from the target rotation angle position is equal to or greater than a predetermined value of 2. If Yes, the process proceeds to step S113 that is a process in which the energization phase switching of the motor 14 is set in the second control pattern. If No, the process proceeds to step S118 that is a process in which the energization phase switching of the motor 14 is set in the third control pattern.

In the step S113, the motor rotational position sensor switching period calculation unit 22 calculates the switching period of the pulse signals H1, H2, H3 in synchronization with the motor rotational position output by the motor rotational position sensor 9.

Next, in step S114, the motor energization phase switching period setting unit 23 sets a predetermined period that is the motor energization phase switching period in the second control pattern. The predetermined period is set to be longer than the motor rotational position sensor switching period with the specific position A determined so that deceleration effect can be obtained. Furthermore, as described above, the predetermined period is changed to an optimum value depending on the switching period of the motor rotational position sensor 9 and the deviation of the actual rotation angle position from the target rotation angle position, which can further enhance the deceleration effect.

In step S115, it is determined whether or not the elapsed time since the energization phase was switched last time is equal to or longer than the predetermined period set in the step S114. If Yes, the process proceeds to step S116 to switch the energization phase of the motor with the motor output pattern 2 in FIG. 9 set. If No, the process proceeds to step S117 without switching the energization phase of the motor.

In the step S117, it is determined whether or not the actual rotation angle position has entered within a predetermined range from the target rotation angle position. If Yes, the process proceeds to step S123. If No, the process returns to the step S111 to continue motor drive.

In the step S118, the motor rotational position sensor switching period calculation unit 22 calculates the switching period of the pulse signals H1, H2, H3 in synchronization with the motor rotational position output by the motor rotational position sensor 9.

Next, in step S119, a second predetermined period that is the motor energization phase switching period in the third control pattern is set. Then, in step S120, it is determined whether or not the elapsed time since the energization phase was switched last time is equal to or longer than the second predetermined period set in the step S119. If Yes, the process proceeds to step S121 to switch the energization phase of the motor with the motor output pattern 3 in FIG. 9 set. If No, the process proceeds to step S122 without switching the energization phase of the motor 14.

In the step S122, it is determined whether or not the actual rotation angle position has entered within a predetermined range from the target rotation angle position. If Yes, the process proceeds to step S123. If No, the process returns to the step S118 to continue motor drive. In the step S123, the energization of the motor 14 is stopped, then the FETs UL, VL, WL of the motor drive circuit are turned on for braking the motor, and then the process ends.

As described above in detail, the shift range switching apparatus in accordance with the first embodiment includes: an actuator 1 for providing rotation output of a motor 14; a detent plate 3 that is rotated by the rotation output of the actuator 1; a detent spring 5 for holding the rotational position of the detent plate 3 by engaging with one of a plurality of notches 3a, 3b, 3c, 3d provided in the detent plate 3; a shift range switching mechanism 6 for switching the actual shift range of an automatic transmission according to the actual rotation angle position that is a rotational position of the detent plate 3 held by the engagement of the detent spring 5 with the notch; a detent position sensor 8 for detecting the actual rotation angle position of the detent plate 3; an actual shift range determination unit 11 for determining the actual shift range of the automatic transmission based on the actual rotation angle position detected by the detent position sensor 8; a shift range setting unit 10 for outputting the requested shift range depending on the operation by a driver; a target rotation angle position calculation unit 12 for calculating the target rotation angle position of the detent plate 3 depending on the requested shift range output from the shift range setting unit 10; and an actuator control unit 13 for driving the actuator 1 so that the actual rotation angle position of the detent plate 3 generally matches the target rotation angle position when the actual shift range determined by the actual shift range determination unit 11 does not match the requested shift range, wherein the shift range switching apparatus includes a motor rotational position sensor 9 for outputting a pulse signal in synchronization with the rotational position of the motor 14, wherein the actuator control unit 13 controls switching of an energization phase of the motor 14 based on pulse signals H1, H2, H3 of the motor rotational position sensor 9, and also has, as a switching control pattern of the energization phase, a first control pattern in which the energization phase is switched on every switching of the pulse signals H1, H2, H3 of the motor rotational position sensor 9, and a second control pattern in which, even when a switching timing of the energization phase due to the switching of the pulse signals H1, H2, H3 of the motor rotational position sensor 9 exists, the energization phase is not switched at least during a predetermined period longer than the switching period of the pulse signals H1, H2, H3 of the motor rotational position sensor 9, and wherein in an acceleration period before a specific position in which the actual rotation angle position of the detent plate 3 is going toward the target rotation angle position and then the rotation of the motor 14 becomes stable, the energization phase is switched with the first control pattern set, then, in a deceleration period after the specific position in which the rotation of the motor 14 is stable and then the actual rotation angle position generally matches the target rotation angle position, the energization phase is switched with the second control pattern set.

According to this configuration, reverse drive for deceleration is not performed and the motor 14 is driven only in one direction, which eliminates the need for including an inhibiting process or an overcurrent protective circuit for preventing current from flowing through the motor drive circuit 21 when the drive direction of the motor 14 is changed from forward to reverse, allowing cost to be reduced. Furthermore, in deceleration, the motor 14 is decelerated while the motor driving force is maintained without reducing motor current, and the motor 14 is reliably step driven by constant degrees to the target rotation angle position while decelerating, which can simplify motor drive current feedback control, allowing man-hours for adaptation to be reduced and allows convergence on the target position without overshooting and undershooting.

Furthermore, in the second control pattern, the predetermined period is set by calculating a period capable of obtaining a maximum deceleration effect based on the switching period of the motor rotational position sensor 9.

According to this configuration, the predetermined period is optimally set to a length with which the period in which a deceleration effect is obtained by holding the energization phase can be most effectively utilized, based on the switching period of the motor rotational position sensor 9, which can further enhance the deceleration effect in the second control pattern.

Furthermore, in the second control pattern, the predetermined period is changed depending on the deviation of the actual rotation angle position from the target rotation angle position.

According to this configuration, the predetermined period is set longer as the deviation of the actual rotation angle position from the target rotation angle position decreases can increase deceleration, which can further improve convergence on the target rotation angle position.

Furthermore, a third control pattern of 180 degrees energization drive is provided, and the second control pattern is switched to the third control pattern depending on the deviation of the actual rotation angle position from the target rotation angle position.

According to this configuration, even when the speed has decreased close to stopping just before convergence on the target rotation angle position, the energization phase switching in the third control pattern of 180 degrees energization drive can step drive the motor by 60 degrees for each the predetermined period, which can further improve convergence on the target rotation angle position.

Furthermore, with a certain combination of the actual shift range and the requested shift range, the switching of the energization phase with the first control pattern set is not performed, but the switching of the energization phase with the second control pattern set is performed first.

According to this configuration, when a shift operation requires a small operational rotation angle of the detent plate and even when the acceleration period in the first control pattern is not set and the motor is driven at constant speed only in the second control pattern, if a requirement on time for reaching the target rotation angle position can be satisfied, the motor is driven in the second control pattern from the start of driving the motor, which can further improve operation stability toward the target rotation angle position.

The shift range switching apparatus in accordance with the first embodiment of the invention has been described above. However, according to the invention, the embodiments may be appropriately modified or omitted within the scope of the invention.

Various modifications and alterations of this invention will be apparent to those skilled in the art without departing from the scope and spirit of this invention, and it should be understood that this is not limited to the illustrative embodiments set forth herein.

What is claimed is:

1. A shift range switching apparatus comprising: an actuator for providing rotation output of a three-phase motor; a detent plate that is rotated by the rotation output of the actuator; a detent spring for holding the rotational position of the detent plate by engaging with one of a plurality of engagement parts provided in the detent plate; a shift range switching mechanism for switching the actual shift range of an automatic transmission according to the actual rotation angle position that is a rotational position of the detent plate held by the engagement of the detent spring with the engagement part; a detent position sensor for detecting the actual rotation angle position of the detent plate; an actual shift range determination unit for determining the actual shift range of the automatic transmission based on the actual rotation angle position detected by the detent position sensor; a shift range setting unit for outputting the requested shift range depending on the operation by a driver; a target rotation angle position calculation unit for calculating the target rotation angle position of the detent plate depending on the requested shift range output from the shift range setting unit; and an actuator control unit for driving the actuator so that the actual rotation angle position of the detent plate generally matches the target rotation angle position when the actual shift range determined by the actual shift range determination unit does not match the requested shift range, wherein the shift range switching apparatus comprises a motor rotational position sensor for outputting a pulse signal in synchronization with the rotational position of the three-phase motor, wherein the actuator control unit controls switching of an energization phase of the three-phase motor based on pulse signals of the motor rotational position sensor, and also has, as a switching control pattern of the energization phase, a first control pattern in which the energization phase is switched on every switching of the pulse signals of the motor rotational position sensor, and a second control pattern in which, even when a switching timing of the energization phase due to the switching of the pulse signals of the motor rotational position sensor exists, the energization phase is not switched at least during a predetermined period longer than the switching period of the pulse signals of the motor rotational position sensor, and wherein in an acceleration period before a specific position in which the actual rotation angle position (Rang) of the detent plate is going toward the target rotation angle position and then the rotation of the three-phase motor becomes stable, the energization phase is switched with the first control pattern set, then, in a deceleration period after the specific position in which the rotation of the three-phase motor is stable and then the actual rotation angle position generally matches the target rotation angle position, the energization phase is switched with the second control pattern set.

2. The shift range switching apparatus according to claim 1, wherein, in the second control pattern, the predetermined period is set by calculating a period capable of obtaining a maximum deceleration effect based on the switching period of the motor rotational position sensor.

3. The shift range switching apparatus according to claim 1, wherein, in the second control pattern, the predetermined period is changed depending on the deviation of the actual rotation angle position from the target rotation angle position.

4. The shift range switching apparatus according to claim 1, wherein, a third control pattern of 180 degrees energization drive is provided, and the second control pattern is switched to the third control pattern depending on the deviation of the actual rotation angle position from the target rotation angle position.

5. The shift range switching apparatus according to claim 1, wherein, with a certain combination of the actual shift range and the requested shift range, the switching of the energization phase with the first control pattern set is not performed, but the switching of the energization phase with the second control pattern set is performed first.

* * * * *